(12) United States Patent
Seok

(10) Patent No.: US 12,080,854 B2
(45) Date of Patent: Sep. 3, 2024

(54) METHOD OF MANUFACTURING ALL-SOLID-STATE BATTERY USING ROLL PRESS PROCESS

(71) Applicants: Hyundai Motor Company, Seoul (KR); Kia Corporation, Seoul (KR)

(72) Inventor: Hoon Seok, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 407 days.

(21) Appl. No.: 17/504,059

(22) Filed: Oct. 18, 2021

(65) Prior Publication Data
US 2022/0158250 A1    May 19, 2022

(30) Foreign Application Priority Data
Nov. 18, 2020    (KR) ........................ 10-2020-0154426

(51) Int. Cl.
| | |
|---|---|
| *H01M 10/05* | (2010.01) |
| *H01M 4/04* | (2006.01) |
| *H01M 10/0525* | (2010.01) |
| *H01M 10/056* | (2010.01) |
| *H01M 10/058* | (2010.01) |
| *H01M 10/0585* | (2010.01) |
| *B32B 37/02* | (2006.01) |

(Continued)

(52) U.S. Cl.
CPC ..... *H01M 10/0585* (2013.01); *H01M 4/0435* (2013.01); *H01M 10/0525* (2013.01); *H01M 10/056* (2013.01); *H01M 10/058* (2013.01); *B32B 37/02* (2013.01); *B32B 2250/05* (2013.01); *B32B 2457/10* (2013.01); *H01M 10/0468* (2013.01); *H01M 10/0562* (2013.01); *H01M 10/0583* (2013.01); *Y10T 156/1049* (2015.01)

(58) Field of Classification Search
CPC ......... H01M 10/0562; H01M 10/0468; H01M 10/0587; H01M 10/0585; H01M 10/0583; H01M 10/058; H01M 4/0435; B32B 37/02; B32B 2457/10; B32B 2250/05
See application file for complete search history.

(56) References Cited

U.S. PATENT DOCUMENTS 5,840,087 A * 11/1998 Gozdz ............... H01M 10/0436
29/623.5
2004/0096733 A1* 5/2004 Shibamoto .......... H01M 10/052
429/231.95

(Continued)

Primary Examiner — Scott W Dodds
(74) Attorney, Agent, or Firm — SLATER MATSIL, LLP

(57) ABSTRACT

An embodiment method of manufacturing an all-solid-state battery includes forming a first electrode member by forming first active material layers on both surfaces of a first current collector, pressing the first electrode member to form a pressed first electrode member, forming a second electrode member by forming second active material layers on both surfaces of a second current collector and forming solid electrolyte layers on the second active material layers, pressing the second electrode member to form a pressed second electrode member, forming a laminated body by layering the pressed first electrode member and the pressed second electrode member, and pressing the laminated body by passing the laminated body between a pair of rollers to form a pressed laminated body.

18 Claims, 4 Drawing Sheets

(51) Int. Cl.
 *H01M 10/04* (2006.01)
 *H01M 10/0562* (2010.01)
 *H01M 10/0583* (2010.01)

(56) References Cited

U.S. PATENT DOCUMENTS

2018/0316042 A1\* 11/2018 Kuhara ............. H01M 10/0413
2020/0028156 A1\* 1/2020 Zhang ................ H01M 4/1391

\* cited by examiner

METHOD OF MANUFACTURING ALL-SOLID-STATE BATTERY USING ROLL PRESS PROCESS

CROSS-REFERENCE TO RELATED APPLICATIONS

This application claims the benefit of Korean Application No. 10-2020-0154426, filed on Nov. 18, 2020, which application is hereby incorporated herein by reference.

TECHNICAL FIELD

The present disclosure relates to a method of manufacturing an all-solid-state battery using a roll press process.

BACKGROUND

An all-solid-state battery includes a three-layered laminated body of a cathode active material layer bonded to a cathode current collector, an anode active material layer bonded to an anode current collector, and a solid electrolyte layer disposed between the cathode active material layer and the anode active material layer.

Because the all-solid-state battery includes an electrolyte layer in a solid state, an ultra-high-pressure pressing process is performed in order to improve the interfacial adhesive strength between the solid electrolyte layer and each active material layer and ionic conductivity during the manufacturing process thereof.

However, when the ultra-high-pressure pressing process is performed, the following problems are very likely to occur.

1) The pressing causes physical damage to the laminated body, resulting in a short circuit and/or a sharp decline in cell performance.

2) Production costs are increased due to the decrease in processability caused by application of ultra-high pressure and due to the addition of equipment for the purpose of deformation control.

Therefore, there is a need for a new manufacturing method to overcome the above-described limitations of the all-solid-state battery.

SUMMARY

Therefore, embodiments of the present disclosure can solve problems encountered in the related art, and specific embodiments thereof are as follows.

An embodiment of the present disclosure provides a method of manufacturing an all-solid-state battery having dimensional stability and cell performance equivalent or superior to those of the related art even without performing an ultra-high-pressure pressing process.

The embodiments of the present disclosure are not limited to the foregoing, and will be able to be clearly understood through the following description and to be realized by the means described in the claims and combinations thereof.

A method of manufacturing an all-solid-state battery according to an embodiment of the present disclosure includes forming first active material layers on both surfaces of a first current collector to obtain a first electrode member, pressing the first electrode member, forming second active material layers on both surfaces of a second current collector and forming solid electrolyte layers on the second active material layers to thus obtain a second electrode member, pressing the second electrode member, layering the pressed first electrode member and the pressed second electrode member to obtain a laminated body, and pressing the laminated body by passing the laminated body between a pair of rollers.

The pressing the first electrode member may include applying a pressure so that the pressed first electrode member has a thickness of 80 to 90% of a thickness before the pressing.

The first electrode member may be pressed by being passed between the pair of rollers.

The pressing the second electrode member may include applying a pressure so that the pressed second electrode member has a thickness of 80 to 90% of a thickness before the pressing.

The second electrode member may be pressed by being passed between the pair of rollers.

The pressing the laminated body may include applying a pressure so that the pressed laminated body has a thickness of 70 to 80% of a thickness before the pressing.

The pressed laminated body may have a thickness of 100 to 300 μm.

In the manufacturing method, each of the first electrode member and the second electrode member may be formed so as to have a length larger than a width, and the first electrode member and the second electrode member may be layered so that one longitudinal end of the second electrode member coincides with one longitudinal end of the first electrode member and so that a remaining longitudinal end of the second electrode member protrudes a predetermined length farther than a remaining longitudinal end of the first electrode member, thereby obtaining the laminated body.

The predetermined length of the remaining protruding end of the second electrode member may be 1/20 to 1/40 of the total length of the second electrode member.

The manufacturing method may further include, after the laminated body is pressed, folding the second electrode member so that the remaining protruding end of the second electrode member surrounds the remaining end of the first electrode member.

The manufacturing method may further include consecutively folding the laminated body in the direction in which the remaining end of the second electrode member is folded.

According to embodiments of the present disclosure, it is possible to obtain an all-solid-state battery having dimensional stability and cell performance equivalent or superior to those of the related art even without performing an ultra-high-pressure pressing process.

The effects of embodiments of the present disclosure are not limited to the foregoing, and should be understood to include all effects that can be reasonably anticipated from the following description.

DETAILED DESCRIPTION OF ILLUSTRATIVE EMBODIMENTS

Figure 1:
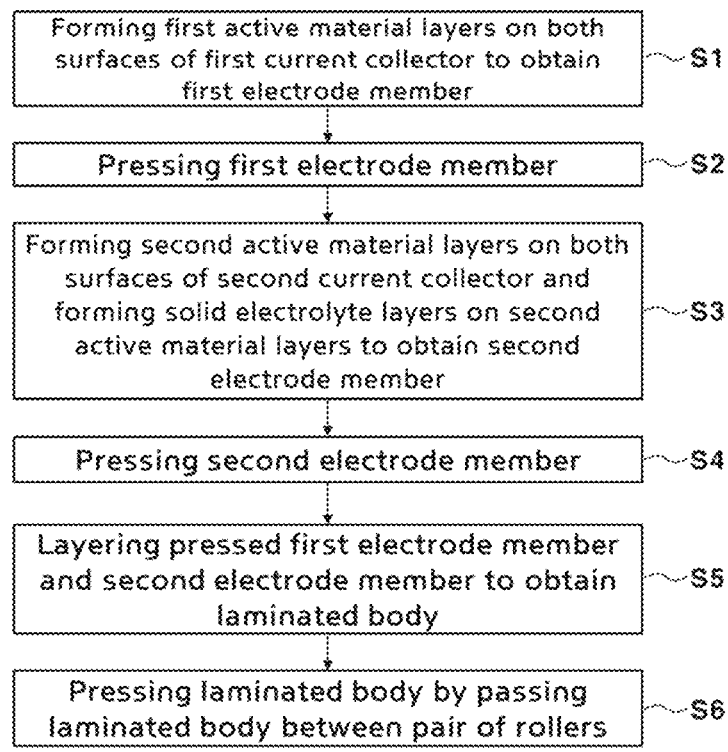
FIG. 1 is a flowchart showing a process of manufacturing an all-solid-state battery according to embodiments of the present disclosure.

The above and other objectives, features and advantages of embodiments of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a flowchart showing a method of manufacturing an all-solid-state battery according to embodiments of the present disclosure. Referring thereto, the manufacturing method includes forming first active material layers on both surfaces of a first current collector to obtain a first electrode member at step S1, pressing the first electrode member at step S2, forming second active material layers on both surfaces of a second current collector and forming solid electrolyte layers on the second active material layers to thus obtain a second electrode member at step S3, pressing the second electrode member at step S4, layering the pressed first electrode member and second electrode member to obtain a laminated body at step S5, and pressing the laminated body by passing the laminated body between a pair of rollers at step S6.

Figure 2:
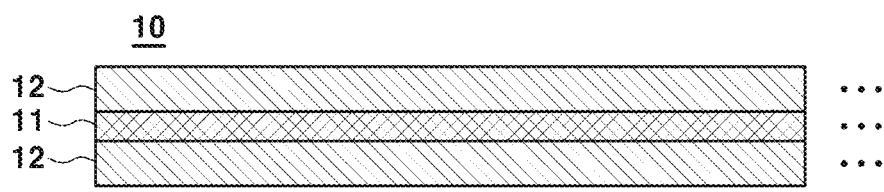
FIG. 2 is a cross-sectional view showing a part of a first electrode member according to embodiments of the present disclosure.

FIG. 2 is a cross-sectional view showing a part of a first electrode member 10. Referring thereto, the first electrode member 10 may include a first current collector 11 and first active material layers 12 formed on both surfaces thereof. The polarity of the first electrode member 10 may be a positive or negative polarity.

When the first electrode member 10 has a positive polarity, the first electrode member may include a cathode current collector and cathode active material layers formed on both surfaces thereof.

The cathode current collector may be a piece of aluminum foil.

The cathode active material layer may include a cathode active material, a solid electrolyte, a conductive material, and a binder.

The cathode active material may be an oxide active material or a sulfide active material.

The oxide active material may be a rock-salt-layer-type active material such as $LiCoO_2$, $LiMnO_2$, $LiNiO_2$, $LiVO_2$, or $Li_{1+x}Ni_{1/3}Co_{1/3}Mn_{1/3}O_2$, a spinel-type active material such as $LiMn_2O_4$ or $Li(Ni_{0.5}Mn_{1.5})O_4$, a reverse-spinel-type active material such as $LiNiVO_4$ or $LiCoVO_4$, an olivine-type active material such as $LiFePO_4$, $LiMnPO_4$, $LiCoPO_4$, or $LiNiPO_4$, an active material containing silicon such as $Li_2FeSiO_4$ or $Li_2MnSiO_4$, a rock-salt-layer-type active material, such as $LiNi_{0.8}Co_{(0.2-x)}Al_xO_2$ ($0<x<0.2$), in which a part of a transition metal is replaced with a dissimilar metal, a spinel-type active material in which a part of a transition metal is replaced with a dissimilar metal, such as $Li_{1+x}Mn_{2-x-y}M_yO_4$ (where M is at least one of Al, Mg, Co, Fe, Ni, and Zn and $0<x+y<2$), or a lithium titanate such as $Li_4Ti_5O_{12}$.

The sulfide active material may be copper chevrel, iron sulfide, cobalt sulfide, or nickel sulfide.

The solid electrolyte may be an oxide solid electrolyte or a sulfide solid electrolyte. However, it may be preferable to use a sulfide-based solid electrolyte having high lithium ionic conductivity. The sulfide-based solid electrolyte is not particularly limited, but may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$-$SiS_2$-$P_2S_5$-LiI, $Li_2S$—$B_2S_3$, $Li_2S$—$P_2S_5$—

$Z_mS_n$ (where m and n are positive numbers and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (where x and y are positive numbers, and M is any one of P, Si, Ge, B, Al, Ga, and In), or $Li_{10}GeP_2S_{12}$.

The conductive material may be carbon black, conductive graphite, ethylene black, or graphene.

The binder may be BR (butadiene rubber), NBR (nitrile butadiene rubber), HNBR (hydrogenated nitrile butadiene rubber), PVDF (polyvinylidene difluoride), PTFE (polytetrafluoroethylene), or CMC (carboxymethylcellulose).

In the step of obtaining the first electrode member 10 at step S1, the method of forming the first active material layers 12 on the first current collector 11 is not particularly limited. For example, a slurry containing the components of the first active material layers 12 may be applied on the first current collector 11, or the first active material layers 12 may be transferred onto the first current collector 11, thus obtaining the first electrode member 10.

Figure 3:
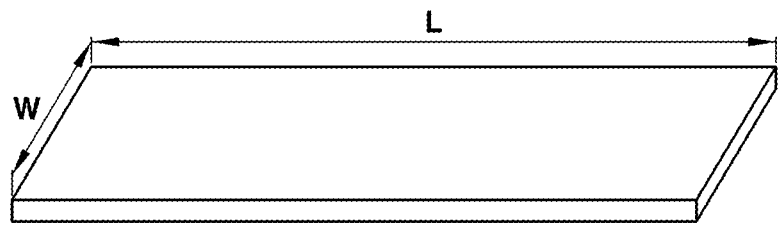
FIG. 3 is a perspective view showing a part of the first electrode member according to embodiments of the present disclosure.

FIG. 3 is a perspective view showing a part of the first electrode member 10. Referring thereto, the first electrode member 10 may be formed so as to have a length L larger than a width W.

In embodiments of the present disclosure, the first electrode member 10 and the second electrode member 20 are each pre-pressed prior to main pressing on the laminated body that includes the first electrode member 10 and the second electrode member 20 layered therein, thereby preventing deformation of the laminated body caused by the main pressing.

Specifically, the step of pressing the first electrode member 10 at step S2 may include applying a pressure so that the first electrode member 10 has a thickness of 80 to 90% of a thickness before the pressing. The pressure may be applied on the first electrode member 10 in a variety of ways. For example, the first electrode member 10 may be isostatically pressed, or may be passed between a pair of rollers so as to be roll-pressed.

Figure 4:
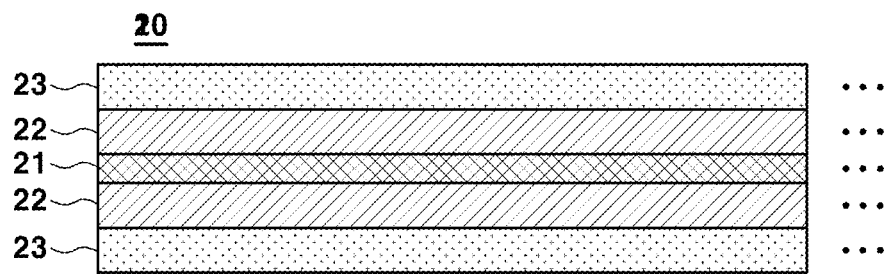
FIG. 4 is a cross-sectional view showing a part of a second electrode member according to embodiments of the present disclosure.

FIG. 4 is a cross-sectional view showing a part of the second electrode member 20. Referring thereto, the second electrode member 20 may include a second current collector 21, second active material layers 22 formed on both surfaces of the second current collector 21, and solid electrolyte layers 23 formed on the second active material layers 22. The polarity of the second electrode member 20 may be a negative or positive polarity, and may be a polarity opposite that of the first electrode member 10.

When the second electrode member 20 has a negative polarity, the second electrode member may include an anode current collector, anode active material layers formed on both surfaces thereof, and solid electrolyte layers on the anode active material layers.

The anode current collector may be a metal thin film including at least one selected from the group consisting of copper (Cu), nickel (Ni), and a combination thereof.

The anode active material layer may include an anode active material, a solid electrolyte, and a binder.

The anode active material is not particularly limited, and may be, for example, a carbon active material or a metal active material.

The carbon active material may be mesocarbon microbeads (MCMB), graphite such as highly oriented graphite (HOPG), or amorphous carbon such as hard carbon or soft carbon.

The metal active material may be In, Al, Si, Sn, or an alloy containing at least one of these elements.

The solid electrolyte may be an oxide solid electrolyte or a sulfide solid electrolyte. However, it may be preferable to use a sulfide-based solid electrolyte having high lithium ionic conductivity. The sulfide-based solid electrolyte is not particularly limited, but may be $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$-$P_2S_5$-LiI, $Li_2S$—$B_2S_3$, $Li_2S$—$P_2S_5$—$Z_mS_n$ (where m and n are positive numbers and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (where x and y are positive numbers and M is any one of P, Si, Ge, B, Al, Ga, and In), or $Li_{10}GeP_2S_{12}$.

The binder may be BR (butadiene rubber), NBR (nitrile butadiene rubber), HNBR (hydrogenated nitrile butadiene rubber), PVDF (polyvinylidene difluoride), PTFE (polytetrafluoroethylene), or CMC (carboxymethylcellulose).

In a step of obtaining the second electrode member 20 at step S3, the method of forming the second active material layers 22 on the second current collector 21 and the method of forming the solid electrolyte layers 23 on the second active material layers 22 are not particularly limited. For example, a slurry containing the components of the second active material layers 22 may be applied on the second current collector 21, or the second active material layers 22 may be transferred onto the second current collector 21. Further, a slurry containing the components of the solid electrolyte layers 23 may be applied on the second active material layers 22, or the solid electrolyte layers 23 may be transferred onto the second active material layers 22.

The second electrode member 20 may be formed so as to have a length L larger than a width W thereof, like the first electrode member 10.

Further, the step of pressing the second electrode member 20 at step S4 may include applying a pressure so that the second electrode member 20 has a thickness of 80 to 90% of a thickness before the pressing. The pressure may be applied on the second electrode member 20 in a variety of ways. For example, the second electrode member 20 may be isostatically pressed, or may be passed between a pair of rollers so as to be roll-pressed.

Figure 5:
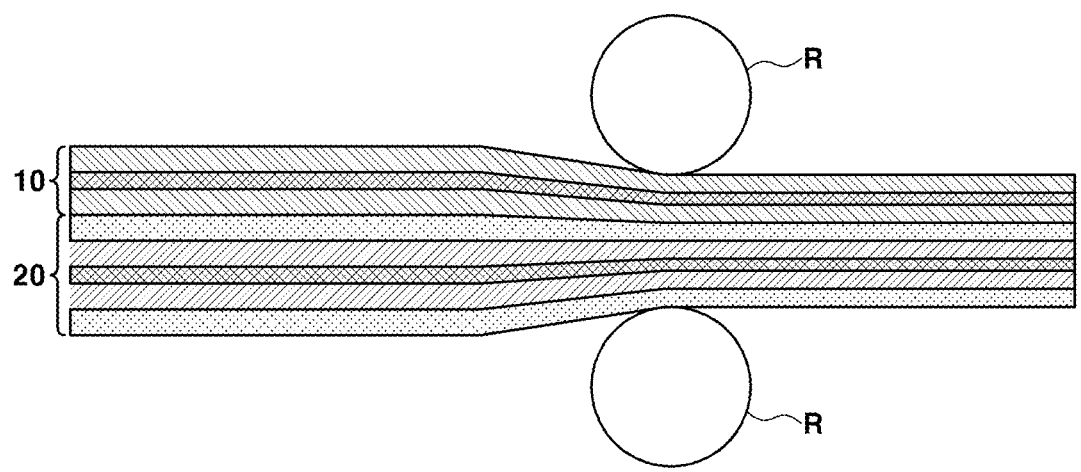
FIG. 5 schematically shows a laminated body according to embodiments of the present disclosure being passed between a pair of rollers so as to be pressed.

Thereafter, the pressed first electrode member 10 and second electrode member 20 may be layered to obtain a laminated body at step S5, and the laminated body may be passed between a pair of rollers R as shown in FIG. 5 so as to be pressed at step S6.

As described above, in the manufacture of a conventional all-solid-state battery, an ultra-high-pressure pressing process is performed for the purpose of realizing bonding strength between the solid electrolyte layer and the active material layer and ionic conductivity. Isostatic pressing is mainly performed, which not only damages the laminated body but is also unsuitable for mass production of all-solid-state batteries.

In embodiments of the present disclosure, the electrode members are pre-pressed prior to main pressing on the laminated body, and the pressed electrode members are layered and pressed using a roll press, thereby ensuring dimensional stability equivalent or superior to that of the related art and also significantly improving productivity.

The step of pressing the laminated body at step S6 may include adjusting an interval between a pair of rollers R so that the pressed laminated body has a thickness of 70 to 80% of a thickness before the pressing, thereby pressing the laminated body. For example, the thickness of the pressed laminated body may be 100 to 300 μm, but is not limited thereto.

Another embodiment of the present disclosure relates to a method of manufacturing a folding-type all-solid-state battery.

Figure 6A:
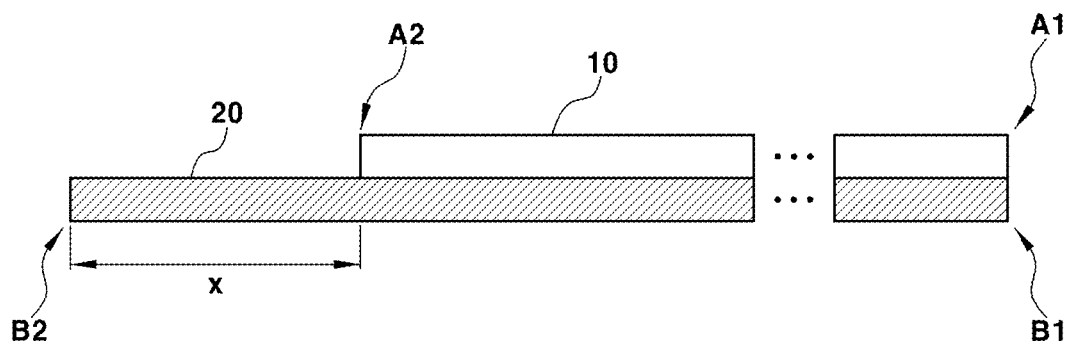
FIG. 6A is a reference view for explaining a process of layering a first electrode member and a second electrode member according to embodiments of the present disclosure.

First, after the first electrode member 10 and the second electrode member 20 are prepared as described above, as shown in FIG. 6A, the first electrode member 10 and the second electrode member 20 may be layered so that one longitudinal end B1 of the second electrode member 20 coincides with one longitudinal end A1 of the first electrode member 10 and so that a remaining longitudinal end B2 of the second electrode member 20 protrudes a predetermined length x farther than a remaining longitudinal end A2 of the first electrode member 10, thereby obtaining the laminated body.

The predetermined length x that the remaining end B2 of the second electrode member 20 protrudes may be 1/20 to 1/40 of the total length of the second electrode member 20.

Figure 6B:
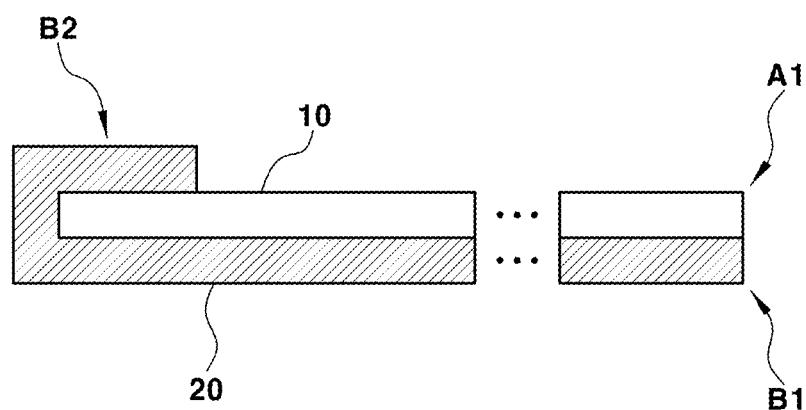
FIG. 6B shows a state in which a remaining end of the second electrode member according to embodiments of the present disclosure is folded so as to surround the first electrode member.

Thereafter, the laminated body may be passed between a pair of rollers R as shown in FIG. 5 so as to be pressed, and the second electrode member 20 may then be folded so that the remaining protruding end B2 of the second electrode member 20 surrounds the remaining end A2 of the first electrode member 10 as shown in FIG. 6B.

Figure 6C:
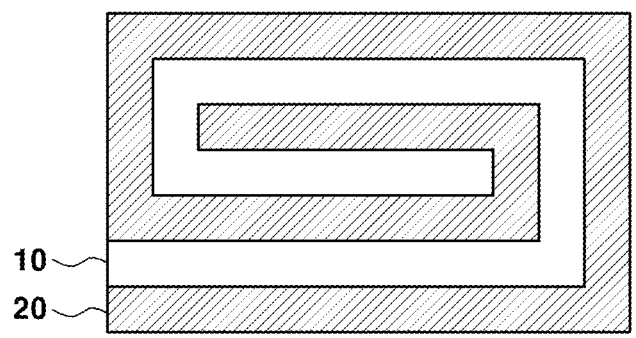
FIG. 6C schematically shows a folding-type all-solid-state battery according to embodiments of the present disclosure.

Finally, the laminated body may be consecutively folded in the direction in which the remaining end B2 of the second electrode member 20 is folded, thus obtaining the folding-type all-solid-state battery shown in FIG. 6C.

Hereinafter, embodiments of the present disclosure will be described in more detail with reference to specific Examples and Experimental Examples. However, these Examples and Experimental Examples are for illustrative purposes only, and the scope of the present disclosure is not limited thereto.

EXAMPLE AND COMPARATIVE EXAMPLE

The Example is an all-solid-state battery obtained by pressing a laminated body, which includes a cathode, including a cathode current collector and a cathode active material layer, an anode active material layer including an anode current collector and an anode active material layer, and a solid electrolyte layer positioned between the cathode active material layer and the anode active material layer, using a roll press as in embodiments of the present disclosure.

The Comparative Example is an all-solid-state battery obtained by forming a cathode, an anode, and a solid electrolyte layer with the same compositions as in the Example and by applying pressure through isostatic pressing, as in the prior art.

The thickness of each component of the laminated bodies according to the Example and the Comparative Example is shown in the following Table 1.

TABLE 1

| Classification | Thickness of cathode | Thickness of anode | Thickness of solid electrolyte layer |
|---|---|---|---|
| Comparative Example | 64.3 μm | 72.2 μm | 33.3 μm |
| Example | 60.3 μm | 69.1 μm | 32.5 μm |

Experimental Example 1

Scanning electron microscope (SEM) analysis was performed on the cross sections of the all-solid-state batteries according to the Example and the Comparative Example.

Figure 7A:
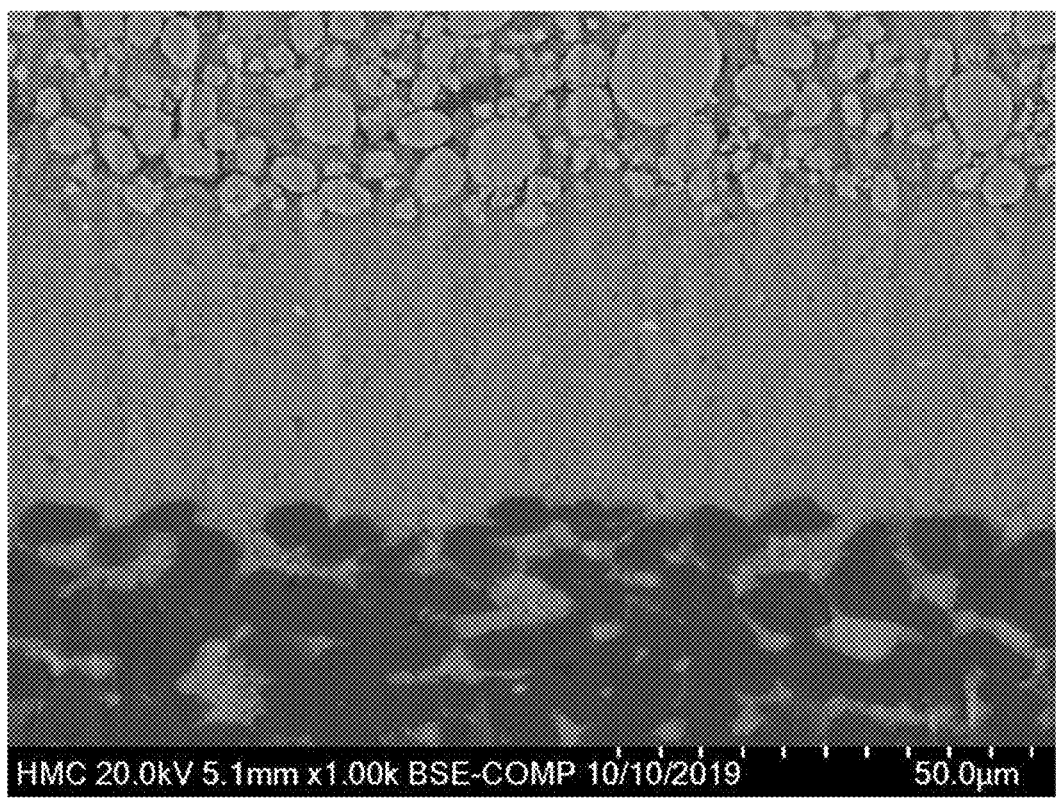
FIG. 7A shows the result of analyzing the cross section of the all-solid-state battery according to a Comparative Example using a scanning electron microscope (SEM)
Figure 7B:
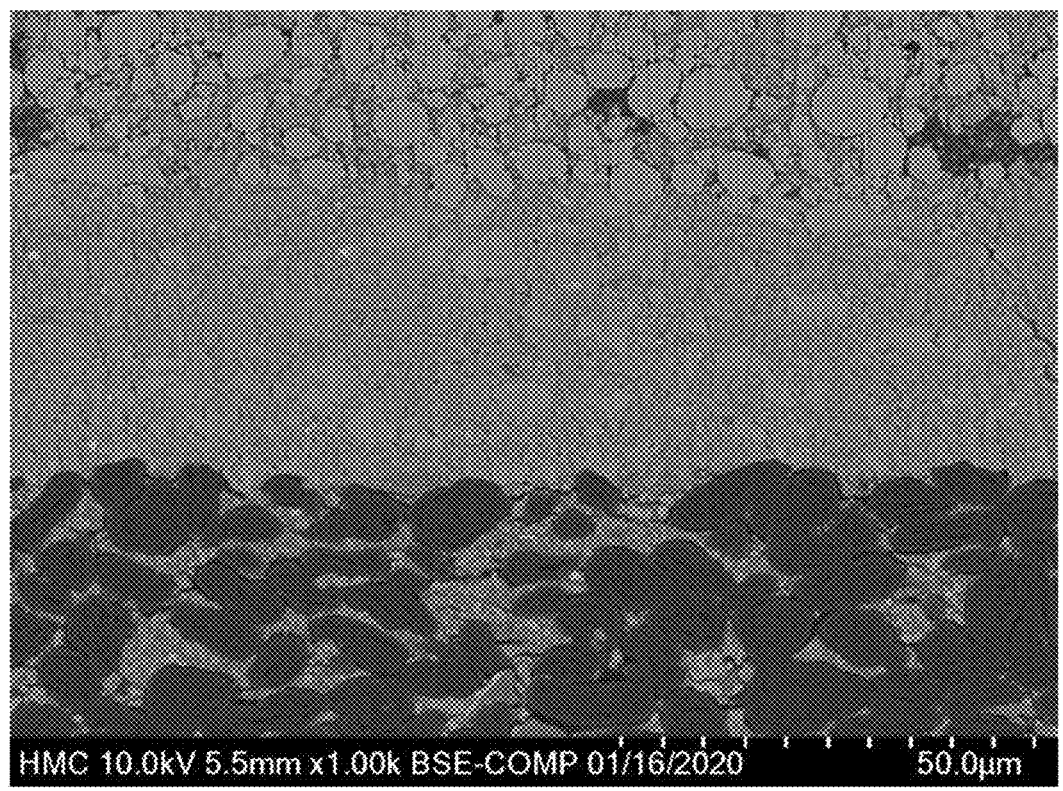
FIG. 7B shows the result of analyzing the cross section of the all-solid-state battery according to an Example of the present disclosure using a scanning electron microscope (SEM).

FIG. 7A shows the result of the Comparative Example, and FIG. 7B shows the result of the Example. Referring thereto, it can be seen that the all-solid-state battery manufactured using the roll press as in the Example includes components densely formed therein, like the all-solid-state battery manufactured by performing isostatic pressing at an ultra-high pressure, as in the prior art.

Experimental Example 2

Charging/discharging capacity and Coulomb efficiency for the all-solid-state batteries according to the Example and the Comparative Example were measured. The results are shown in the following Table 2.

TABLE 2

| Classification | Charging capacity [mAh] | Discharging capacity [mAh] | Coulomb efficiency [%] |
|---|---|---|---|
| Comparative Example | 43.9 | 31.1 | 70.8 |
| Example | 43.0 | 30.2 | 70.2 |

Referring thereto, it can be seen that the all-solid-state batteries according to the Example and the Comparative Example have the same level of charge/discharge capacity and Coulomb efficiency.

According to embodiments of the present disclosure, as described above, it is possible to obtain an all-solid-state battery having performance equivalent or superior to those of the related art. Further, since a roll press is used in the method of manufacturing the all-solid-state battery according to embodiments of the present disclosure, this method is more suitable for mass production than an ultra-high-pressure isostatic pressing process.

The test examples and examples of embodiments of the present disclosure have been described in detail above, but the scope of the present invention is not limited to the test examples and examples described above. Various modifications and improvements capable of being devised by those skilled in the art using the basic concept of the present disclosure defined in the following claims are also incorporated in the scope of the present disclosure.

What is claimed is:

1. A method of manufacturing an all-solid-state battery, the method comprising:
   forming a first electrode member by forming first active material layers on both surfaces of a first current collector;
   pressing the first electrode member to form a pressed first electrode member;
   forming a second electrode member by forming second active material layers on both surfaces of a second current collector and forming solid electrolyte layers on the second active material layers, wherein the forming of the second electrode member occurs before any pressing of the second electrode member;
   pressing the second electrode member to form a pressed second electrode member;
   forming a laminated body by layering the pressed first electrode member and the pressed second electrode member; and
   pressing the laminated body by passing the laminated body between a pair of rollers to form a pressed laminated body, wherein pressing the laminated body comprises applying a pressure so that the pressed laminated body has a thickness of 70 to 80% of a thickness of the laminated body before the pressing.

2. The method of claim 1, wherein pressing the first electrode member comprises applying a pressure so that the pressed first electrode member has a thickness of 80 to 90% of a thickness of the first electrode member before the pressing.

3. The method of claim 1, wherein pressing the first electrode member comprises passing the first electrode member between the pair of rollers.

4. The method of claim 1, wherein pressing the second electrode member comprises applying a pressure so that the pressed second electrode member has a thickness of 80 to 90% of a thickness of the second electrode member before the pressing.

5. The method of claim 1, wherein pressing the second electrode member comprises passing the second electrode member between the pair of rollers.

6. The method of claim 1, wherein the pressed laminated body has a thickness of 100 to 300 μm.

7. A method of manufacturing an all-solid-state battery, the method comprising:
  forming a first electrode member by forming first active material layers on both surfaces of a first current collector, wherein the first electrode member has a larger length than width;
  pressing the first electrode member to form a pressed first electrode member;
  forming a second electrode member by forming second active material layers on both surfaces of a second current collector and forming solid electrolyte layers on the second active material layers, wherein:
    the second electrode member has a larger length than width, and
    the forming of the second electrode member occurs before any pressing of the second electrode member;
  pressing the second electrode member to form a pressed second electrode member;
  forming a laminated body by layering the pressed first electrode member and the pressed second electrode member, wherein a first longitudinal end of the pressed second electrode member coincides with a first longitudinal end of the pressed first electrode member and a second longitudinal end of the pressed second electrode member protrudes a predetermined distance farther than a second longitudinal end of the pressed first electrode member; and
  pressing the laminated body by passing the laminated body between a pair of rollers to form a pressed laminated body.

8. The method of claim 7, wherein the predetermined distance is 1/20 to 1/40 of a total length of the pressed second electrode member.

9. The method of claim 7, further comprising, after pressing the laminated body, folding the pressed second electrode member so that the second longitudinal end of the pressed second electrode member surrounds the second longitudinal end of the pressed first electrode member.

10. The method of claim 9, further comprising consecutively folding the laminated body in a direction in which the second longitudinal end of the pressed second electrode member is folded.

11. The method of claim 7, wherein pressing the first electrode member comprises applying a pressure so that the pressed first electrode member has a thickness of 80 to 90% of a thickness of the first electrode member before the pressing.

12. The method of claim 7, wherein pressing the first electrode member comprises passing the first electrode member between the pair of rollers.

13. The method of claim 7, wherein pressing the second electrode member comprises applying a pressure so that the pressed second electrode member has a thickness of 80 to 90% of a thickness of the second electrode member before the pressing.

14. The method of claim 7, wherein pressing the second electrode member comprises passing the second electrode member between the pair of rollers.

15. The method of claim 7, wherein pressing the laminated body comprises applying a pressure so that the pressed laminated body has a thickness of 70 to 80% of a thickness of the laminated body before the pressing.

16. The method of claim 7, wherein the pressed laminated body has a thickness of 100 to 300 μm.

17. A method of manufacturing an all-solid-state battery, the method comprising:
  forming a first electrode member by forming first active material layers on both surfaces of a first current collector;
  pressing the first electrode member to form a pressed first electrode member, wherein the pressed first electrode member has a thickness of 80 to 90% of a thickness of the first electrode member before the pressing;
  forming a second electrode member by forming second active material layers on both surfaces of a second current collector and forming solid electrolyte layers on the second active material layers, wherein the forming of the second electrode member occurs before any pressing of the second electrode member;
  pressing the second electrode member to form a pressed second electrode member, wherein the pressed second electrode member has a thickness of 80 to 90% of a thickness of the second electrode member before the pressing;
  forming a laminated body by layering the pressed first electrode member and the pressed second electrode member; and
  pressing the laminated body by passing the laminated body between a pair of rollers to form a pressed laminated body,
  wherein the pressed laminated body has a thickness of 70 to 80% of a thickness of the laminated body before the pressing.

18. The method of claim 17, wherein:
  pressing the first electrode member comprises passing the first electrode member between the pair of rollers; and
  pressing the second electrode member comprises passing the second electrode member between the pair of rollers.

* * * * *